(12) United States Patent
Mueller et al.

(10) Patent No.: US 9,299,355 B2
(45) Date of Patent: Mar. 29, 2016

(54) FM STEREO RADIO RECEIVER BY USING PARAMETRIC STEREO

(75) Inventors: Jan Mueller, Nuremberg (DE); Robin Thesing, Nuremberg (DE); Michael Beer, Erlangen (DE)

(73) Assignee: Dolby International AB, Amsterdam Zuidoost (NL)

( * ) Notice: Subject to any disclaimer, the term of this patent is extended or adjusted under 35 U.S.C. 154(b) by 135 days.

(21) Appl. No.: 14/234,293

(22) PCT Filed: Jul. 20, 2012

(86) PCT No.: PCT/EP2012/064258
§ 371 (c)(1),
(2), (4) Date: Jan. 22, 2014

(87) PCT Pub. No.: WO2013/017435
PCT Pub. Date: Feb. 7, 2013

(65) Prior Publication Data
US 2014/0161262 A1    Jun. 12, 2014

Related U.S. Application Data

(60) Provisional application No. 61/551,103, filed on Oct. 25, 2011.

(30) Foreign Application Priority Data

Aug. 4, 2011 (EP) .................................. 11176523

(51) Int. Cl.
*G10L 19/008* (2013.01)
*H04B 1/16* (2006.01)
(Continued)

(52) U.S. Cl.
CPC .............. *G10L 19/008* (2013.01); *G10L 19/00* (2013.01); *H04B 1/1661* (2013.01); *H04H 40/45* (2013.01)

(58) Field of Classification Search
CPC .. H04B 1/1661; H04B 1/1669; H04B 1/1676; H04B 1/1684; H04R 1/20; H04R 5/00; G10L 19/00; G10L 19/008; H04H 20/88; H04H 20/44; H04H 20/47; H04H 20/48; H04H 40/36; H04H 40/45; H04H 40/81
USPC ............................................ 381/2, 3, 11, 23
See application file for complete search history.

(56) References Cited

U.S. PATENT DOCUMENTS

| 7,983,922 B2 | 7/2011 | Neusinger |
| 8,015,018 B2 * | 9/2011 | Seefeldt et al. ............... 704/501 |

(Continued)

FOREIGN PATENT DOCUMENTS

| CN | 101604983 | 12/2009 |
| JP | 2010-504017 | 2/2010 |

(Continued)

OTHER PUBLICATIONS

Xiong Peng, "Optimization Research for Quantization Algorithms of Stereo Parameters in Enhanced AAC+ Encoder" pp. 260-263, Telecommunication Science, Nov. 20, 2010.

(Continued)

*Primary Examiner* — Ahmad F Matar
*Assistant Examiner* — Sabrina Diaz

(57) ABSTRACT

The invention relates to an apparatus (1) for improving a stereo audio signal of an FM stereo radio receiver (10). It is suggested to employ components of a standard HE-ACC v2 decoder (40) in such apparatus (1) to efficiently recover the stereo audio signal (L\R') while also exhibiting good signal quality. To that end, parametric stereo parameters (15) shall be quantized and submitted to such decoder (40) together with a mono-downmix signal (25). The decoder (25) can then easily recover the parametric stereo parameters (15) by de-quantizing them via a simple lookup table, and finally creating the stereo output signal (L'R') from the de-quantized parametric stereo parameters and the mono-downmix signal (25). The apparatus (1) further includes a parameter estimation stage (5) which may again be embodied on the basis of components of a standard HE-ACC v2 encoder (65). After estimating the parametric stereo parameters (15) and generating the mono-downmix signal (25), the encoder (65) will not use further encoding other than the already performed PS-coding. An apparatus (1) according to the invention therefore advantageously includes decoder (40) and/or encoder (65) components of a standard HE-ACC v2 codec—utilizing its parametric stereo parameter processing capabilities.

8 Claims, 1 Drawing Sheet

(51) Int. Cl.
*H04H 40/45* (2008.01)
*G10L 19/00* (2013.01)

(56) References Cited

U.S. PATENT DOCUMENTS

| | | |
|---|---|---|
| 8,054,981 B2 | 11/2011 | Roeden |
| 2006/0004583 A1 | 1/2006 | Herre |
| 2007/0160236 A1 | 7/2007 | Ilda |
| 2008/0077412 A1 | 3/2008 | Oh |
| 2009/0024397 A1* | 1/2009 | Ryu et al. ............ 704/500 |
| 2010/0080397 A1* | 4/2010 | Suzuki et al. ............ 381/22 |
| 2011/0137661 A1 | 6/2011 | Morii |
| 2012/0207307 A1* | 8/2012 | Engdegard et al. ............ 381/3 |
| 2013/0142339 A1 | 6/2013 | Purnhagen |
| 2013/0142340 A1 | 6/2013 | Sehlstrom |

FOREIGN PATENT DOCUMENTS

| | | |
|---|---|---|
| WO | 03/090208 | 10/2003 |
| WO | 2007/011157 | 1/2007 |
| WO | 2011/039195 | 4/2011 |

OTHER PUBLICATIONS

Schuijers, E. et al, "Advances in Parametric Coding for High Quality Audio," AES, Mar. 22-25, 2003.

MPEG Surround Standard, ISO/IEC 23003-1: 2007.

Purnhagen, Heiko, "Low Complexity Parametric Stereo Coding in MPEG-4" Proceedings of the 7th Int. Conference on Digital Audio Effects Naples, Italy, Oct. 5-8, 2004, pp. 163-168.

ISO/IEC 14496-3:2005, Information Technology—Coding of Audio-Visual Objects—Part 3:Audio, 2005.

Faller, C. et al. "Binaural Cue Coding—Part II: Schemes and Applications" IEEE Transactions on Speech and Audio Processing, vol. 11, No. 6, Nov. 2003, pp. 520-531.

Schuijers, et al., "Low Complexity Parametric Stereo Coding" Audio Engineering Society, Convention Paper 6073, Presented at the 116th Convention, May 8-1, 2004, Berlin, Germany. p. 11.

Baumgarte, F. et al. "Binaural Cue Coding—Part 1: Psychoacoustic Fundamentals and Design Principles" IEEE Transactions on Speech and Audio Processing, vol. 11, No. 6, Nov. 2003, pp. 509-519.

\* cited by examiner

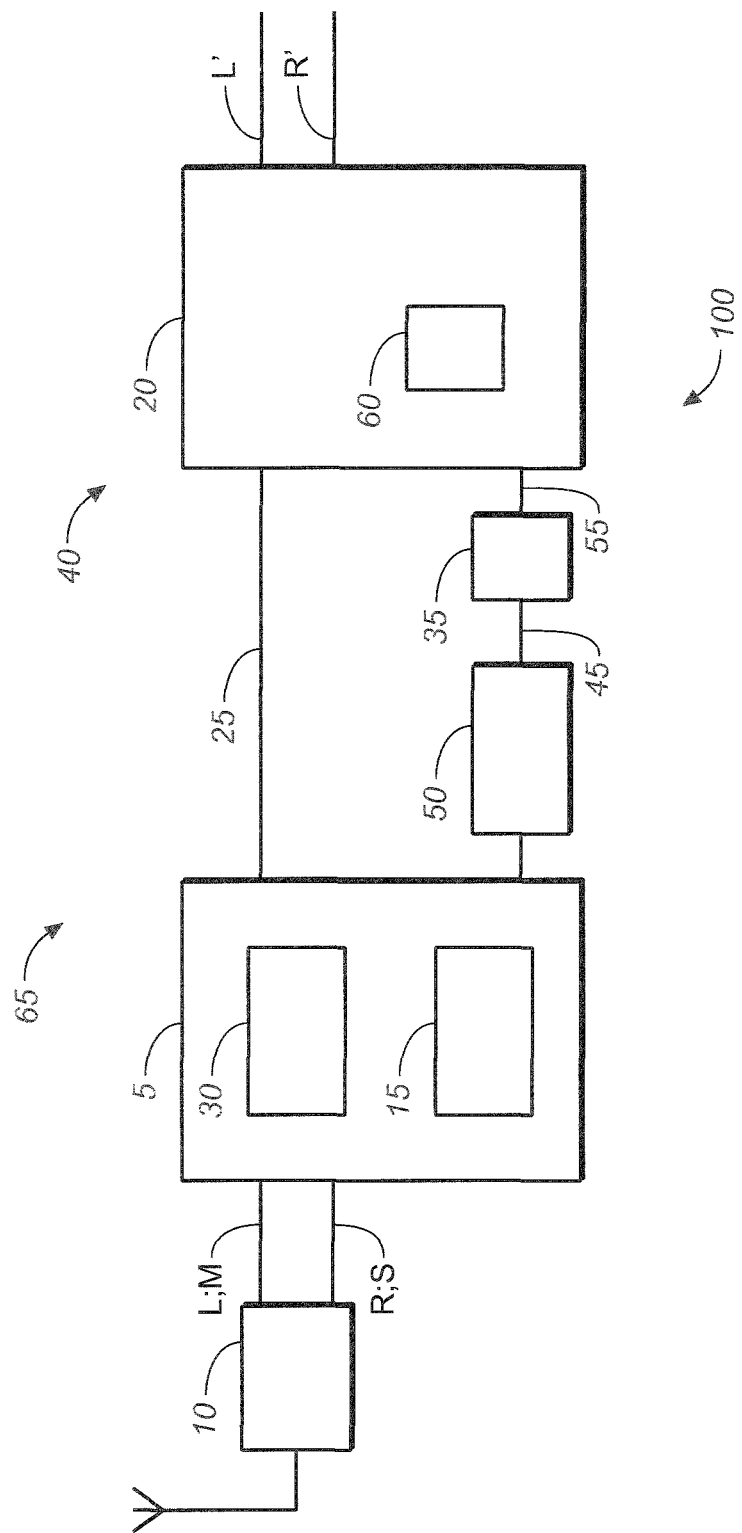

FM STEREO RADIO RECEIVER BY USING PARAMETRIC STEREO

CROSS-REFERENCE TO RELATED APPLICATIONS

This application claims priority to European Patent Application No. 11176523.6, filed Aug. 4, 2011 and U.S. Provisional Patent Application No. 61/551,103, filed Oct. 25, 2011, each of which is hereby incorporated by reference in its entirety.

TECHNICAL FIELD

The invention relates to audio signal processing, in particular to an apparatus and a corresponding method for improving an audio signal of an FM stereo radio receiver.

BACKGROUND OF THE INVENTION

PCT/EP2010/005481 discloses an FM stereo radio receiver utilizing parametric stereo in various embodiments. This disclosure shall herewith be incorporated by reference in its entirety.

In an analog FM (frequency modulation) stereo radio system, the left channel (L) and right channel (R) of the audio signal are conveyed in a mid-side (M/S) representation, i.e. as mid channel (M) and side channel (S). The mid channel M corresponds to a sum signal of L and R, e.g. M=(L+R)/2, and the side channel S corresponds to a difference signal of L and R, e.g. S=(L−R)/2. For transmission, the side channel S is modulated onto a 38 kHz suppressed carrier and added to the baseband mid signal M to form a backwards-compatible stereo multiplex signal. This multiplex signal is then used to modulate the HF (high frequency) carrier of the FM transmitter, typically operating in the range between 87.5 to 108 MHz.

When reception quality decreases (i.e. the signal-to-noise ratio over the radio channel decreases), the S channel typically suffers more than the M channel. In many FM receiver implementations, the S channel is muted when the reception conditions gets too noisy. This means that the receiver falls back from stereo to mono in case of a poor HF radio signal.

Parametric Stereo (PS) coding is a technique from the field of very low bitrate audio coding. PS allows encoding a 2-channel stereo audio signal as a mono downmix signal in combination with additional PS side information, i.e. the PS parameters. The mono downmix signal is obtained as a combination of both channels of the stereo signal. The PS parameters enable the PS decoder to reconstruct a stereo signal from the mono downmix signal and the PS side information. Typically, the PS parameters are time- and frequency-variant, and the PS processing in the PS decoder is typically carried out in a hybrid filterbank domain incorporating a QMF bank. The document "Low Complexity Parametric Stereo Coding in MPEG-4", Heiko Purnhagen, Proc. Digital Audio Effects Workshop (DAFx), pp. 163-168, Naples, IT, October 2004 describes an exemplary PS coding system for MPEG-4. Its discussion of parametric stereo is hereby incorporated by reference. Parametric stereo is supported by MPEG-4 Audio. Parametric stereo is discussed in section 8.6.4 and Annexes 8.A and 8.0 of the MPEG-4 standardization document ISO/IEC 14496-3:2005 (MPEG-4 Audio, 3rd edition). These parts of the standardization document are hereby incorporated by reference for all purposes. Parametric stereo is also used in the MPEG Surround standard (see document ISO/IEC 23003-1: 2007, MPEG Surround). Also, this document is hereby incorporated by reference for all purposes. Further examples of parametric stereo coding systems are discussed in the document "Binaural Cue Coding—Part I: Psychoacoustic Fundamentals and Design Principles," Frank Baumgarte and Christof Faller, IEEE Transactions on Speech and Audio Processing, vol 11, no 6, pages 509-519, November 2003, and in the document "Binaural Cue Coding—Part II: Schemes and Applications," Christof Faller and Frank Baumgarte, IEEE Transactions on Speech and Audio Processing, vol 11, no 6, pages 520-531, November 2003. In the latter two documents the term "binaural cue coding" is used, which is an example of parametric stereo coding.

Even in case the mid signal M is of acceptable quality, the side signal S may be very noisy and thus can severely degrade the overall audio quality when being mixed in the left and right channels of the output signal (which are derived e.g. according to L=M+S and R=M−S). When a side signal S has only poor to intermediate quality, there are two options: either the receiver chooses accepting the noise associated with the side signal S and outputs real stereo, or the receiver drops the side signal S and falls back to mono.

SUMMARY OF THE INVENTION

A first aspect of the invention relates to an apparatus for improving an audio signal of an FM stereo radio receiver. The apparatus generates a stereo audio signal. The audio signal to be improved may be an audio signal in L/R representation, i.e. an L/R audio signal, or in an alternative embodiment an audio signal in M/S representation, i.e. an M/S audio signal. Typically, the audio signal to be improved is an audio signal in L/R representation since conventional FM radio receivers use an L/R output.

As an exemplary embodiment of the present invention, the apparatus is for an FM stereo radio receiver configured to receive an FM radio signal comprising a mid signal and side signal.

The apparatus comprises a parametric stereo (PS) parameter estimation stage. The parameter estimation stage is configured to determine one or more PS parameters based on the L/R or M/S audio signal in a frequency-variant or frequency-invariant manner. The one or more parameters may include a parameter indicating inter-channel intensity differences (IID or also called CLD—channel level differences) and/or a parameter indicating an inter-channel cross-correlation (ICC). Preferably, these PS parameters are time and frequency-variant.

Moreover, the apparatus comprises an upmix stage. The upmix stage is configured to generate the stereo signal based on a first audio signal and the one or more PS parameters.

The first audio signal is obtained from the L/R or M/S audio signal, e.g. by a downmix operation in a downmix stage. The first audio signal may be obtained from the audio signal in case of an L/R representation by a downmix operation according to the following formula: DM=(L+R)/a, with DM corresponding to the first audio signal. For example, the parameter a is selected to be 2. In case of DM=(L+R)/a, the first audio signal essentially corresponds to the received mid signal M. In more advanced adaptive downmix schemes, the two parameters $a_1$, $a_2$ for combining the two channels according to the formula DM=L/$a_1$+R/$a_2$ may be different and/or may depend on the PS parameters and/or other signal properties.

In case of an M/S representation at the output of the FM stereo radio receiver, the first audio signal may simply correspond to the M signal of the M/S audio signal at the output.

The PS parameter estimation stage can be part of a PS encoder. The upmix stage can be part of a PS decoder.

The apparatus is based on the idea that due to its noise the received side signal may be not good enough for reconstructing the stereo signal by simply combining the received mid and side signals; nevertheless, in this case the side signal or the side signal's component in the L/R signal may be still good enough for stereo parameter analysis in the PS parameter estimation stage. These PS parameters may be then used for reconstructing the stereo signal.

Thus, the apparatus enables improved stereo reception under conditions of intermediate or even large noise in the side signal. It should be noted that the term "noise" is usually used in this specification to refer to the noise introduced from the limitations of the radio transmission channel (as opposed to the noise-like signal component originating in the actual audio signal being broadcast).

Instead of using a received noisy side signal to create the stereo audio signal, an improved side signal generated at receiver may be used. The improved side signal may be generated with help of techniques from PS coding. These include e.g. the generation of components of the improved side signal by means of a decorrelator operating on the first audio signal as input. Data about reception conditions and/or an analysis of the received stereo signal can be used to adaptively control the generation of the improved side signal and also the generation of the audio output signals.

According to another embodiment, the apparatus further comprises a decorrelator configured to generate a decorrelated signal based on the first audio signal. The upmix stage may generate the stereo signal based on the first audio signal, the one or more PS parameters and the decorrelated signal or at least frequency band of the decorrelated signal.

Instead of using the decorrelated signal, the upmix stage may use the received side signal for the upmix, e.g. in case of good reception conditions when the noise of the received side signal is low. Therefore, according to an embodiment, for the upmix selectively the received side signal or the decorrelated signal is used. More preferably, the selection is frequency-variant. For example, the upmix stage may use the received side signal for lower frequencies and may use the decorrelated signal as a pseudo side signal for higher frequencies since the higher the frequency, the larger is the noise density. This is a typical property of the FM demodulation in case of additive (white) noise on the radio channel. This will be explained in detail later in the specification.

The received side signal or at least one or more frequency components thereof may be used for upmix if the first signal corresponds to the mid signal. In case of a different downmix scheme (which is different from (L+R)/a for generating the first audio signal), a residual signal may be used for upmix instead of using the received side signal. Such a residual signal indicates the error associated with representing original channels by their downmix and PS parameters and is often used in PS encoding schemes. The above remarks to the use of the received side signal also apply to a residual signal.

The selection between the received side signal and the decorrelated signal for upmix may be signal-dependent or in other words signal-adaptive.

According to yet another embodiment, the selection depends on the reception conditions indicated by a radio reception indicator, such as the signal strength and/or on an indicator indicative of the quality of the received side signal. In case of good reception conditions (i.e. high strength), the received side signal can be preferably used for upmix (in some cases, not for the highest frequencies), whereas in case of intermediate reception conditions (i.e. lower strength), the decorrelated signal can be used for upmix.

In very bad reception conditions with high levels of noise on the side signal, the FM receiver may switch to a mono output mode to decrease the noise of the audio signal. In case of an L/R stereo audio signal at the output of the FM receiver, both channels at the output have the same signal in mono playback. In case of an M/S stereo signal at the output of the FM receiver, the S channel at the output is muted. In the mono output mode the stereo information is missing in the audio signal of the FM receiver. Thus, the PS parameter estimation stage cannot determine PS parameters suitable for creating a real stereo signal in the upmix stage. Even if the FM receiver does not switch to mono output mode in very bad reception conditions, the audio signal at the output of the FM receiver may be too bad for estimation of meaningful PS parameters.

The apparatus can be configured to detect whether the FM receiver has selected mono output of the stereo radio signal and/or can be configured to notice such poor reception conditions (which are too poor for estimation of meaningful PS parameters). In case of detecting mono output or in case of detecting such poor reception conditions, the upmix stage may generate a pseudo stereo signal. The upmix stage use one or more upmix parameters for blind upmix instead of the estimated parameters as discussed above. This mode is referred to as pseudo stereo operation or blind upmix operation.

Blind upmix operation specifies, in this case, that after detecting poor reception conditions or detecting mono output and thus initiating the blind upmix operation, spatial acoustic information—if at all present—in the output signal of the FM receiver is not used for determining the upmix parameters and thus is not considered for the upmix (if there is already a mono output at the output of the FM receiver no spatial acoustic information is present and thus cannot be considered at all). In contrast to the PS operation mode discussed above where the PS parameters are determined for reconstructing the side signal in the output signal of the upmix stage, in blind upmix operation the apparatus does not aim for reconstructing the side signal at the output signal of the upmix stage.

However, blind upmix does not mean that the apparatus is "blind" in that the upmix parameters are necessarily independent of the output signal of the FM receiver. E.g. the output signal of the FM receiver may be monitored whether it is music or speech, and dependent thereon appropriate upmix parameters may be selected.

One embodiment for blind upmix is to use preset upmix parameters. The preset upmix parameters may be default or stored upmix parameters.

Nevertheless, the used upmix parameters may be signal dependent, e.g. upmix parameters for speech and upmix parameters for music. In this case, the apparatus further has a speech detector (e.g. a speech/music discriminator) which detects whether the audio signal is predominantly speech or music. For example, in case of pure music the upmix parameters may be selected such that the downmix signal and the decorrelated version thereof are mixed, whereas in case of pure speech the upmix parameters may be selected such that the decorrelated version of the downmix signal is not used and only the downmix signal is used for upmix to a "mono" left/right signal. In case of an audio signal being a mixture of speech and music, blind upmix parameters may be used which are in between the upmix parameters for pure speech and the upmix parameters for pure music. One can further use interpolated upmix parameters for all states in between.

Advanced blind upmix schemes to pseudo stereo can be envisioned, where an even more advanced analysis of the mono signal is performed and this is used as the basis to derive "artificially generated" or "synthetic" PS parameters.

For a side signal with practically only noise, the apparatus preferably switches to pseudo stereo mode as discussed above. As noted above, the term "noise" here refers to the noise introduced by the bad radio reception (i.e. low signal-to-noise ratio on the radio channel), not to noise contained in the original signal sent to the FM broadcast transmitter.

However, for a side signal with almost no noise, i.e. almost no noise originating from the FM radio transmission, the apparatus preferably switches to normal stereo mode instead of parametric stereo mode. In normal stereo mode, the apparatus' signal improvement functionality is essentially deactivated. For deactivation, the left/right audio signal at the input of apparatus may be essentially fedthrough to the output of the apparatus.

Alternatively, for deactivation only the received side signal (and not the decorrelated signal) is mixed with the first audio signal in the upmix stage. When appropriately selecting the upmix parameters in the upmix stage, the output signal of the upmix stage corresponds to the output signal of the FM transmitter: e.g. when mixing of the first audio signal DM and the received side signal $S_0$ according to $$L'=DM+S_0 \text{ and } R'=DM-S_0, \text{ in case } DM=(L+R)/2 \text{ and } S_0=(L-R)/2.$$

More preferably in some instances, the normal stereo mode or the parametric stereo mode may be selected in a frequency-variant manner, i.e. the selection may be different for the different frequency bands. This is useful since the signal-to-noise ratio for the received side signal characteristically gets worse for higher frequencies. As discussed above, this is a typical property of the FM demodulation.

A second aspect of the invention relates to an apparatus for generating a stereo signal based on left/right or mid/side audio signal of an FM stereo radio receiver. The apparatus is configured for noticing that the FM stereo receiver has selected mono output of the stereo radio signal or the apparatus is configured for noticing poor radio reception. The apparatus comprises a stereo upmix stage. The upmix stage is configured to generate the stereo signal based on a first audio signal and one or more upmix parameters for blind upmix in case the apparatus notices that the FM stereo receiver has selected mono output of the stereo radio signal or the apparatus notices poor reception. The first audio signal is obtained from the left/right or mid/side audio signal.

The upmix parameters for blind upmix may be preset parameters, such as default or stored parameters.

The apparatus allows generation of a pseudo stereo signal having a low level noise in case of very bad reception conditions with high levels of noise on the side signal. In such reception conditions, the FM receiver may switch to mono mode to decrease the noise of the audio signal or the L/R or M/S audio signal may be too bad for estimation of meaningful PS parameters. This is detected and then upmix parameters blind upmix are used for generating a pseudo stereo signal. This was already discussed in connection with the first aspect of the invention.

As also discussed in connection with the first aspect of the invention, the apparatus may comprise a detection stage for detecting whether the FM stereo receiver has selected mono output of the stereo radio signal.

According to an exemplary embodiment, the apparatus further comprises an audio type detector, such as a speech detector indicating whether the audio signal at the output of the FM transmitter is predominantly speech or not. In this case, the upmix parameters are dependent on the indication of the speech detector. E.g. the apparatus uses upmix parameters in case of speech and different upmix parameters in case of music as discussed in detail in connection with the first aspect of the invention.

The apparatus according to the second aspect of the invention may further include the features of the apparatus according to the first aspect of the invention and vice versa.

A third aspect of the invention relates to an FM stereo radio receiver configured to receive an FM radio signal comprising a mid signal and a side signal. The FM stereo radio receiver includes an apparatus for improving the audio signal according to the first and second aspects of the invention.

A fourth aspect of the invention relates to a mobile communication device, such as a cellular telephone. The mobile communication device comprises an FM stereo receiver configured to receive an FM radio signal. Moreover, the mobile communication device comprises an apparatus for improving the audio signal according to the first and second aspects of the invention.

A fifth aspect of the invention relates a method for improving a left/right or mid/side audio signal of an FM stereo radio receiver. The features of the method according to the fifth aspect correspond to the features of the apparatus according to the first aspect. One or more PS parameters are determined based on the left/right or mid/side audio signal in a frequency-variant or frequency-invariant manner. The stereo signal is generated based on said first audio signal and the one or more PS parameters by an upmix operation.

The remarks to the first aspect of the invention also apply to the fifth aspect of the invention.

A sixth aspect of the invention relates to a method for generating a stereo signal based on left/right or mid/side audio signal of an FM stereo radio receiver. The features of the method according to the sixth aspect correspond to the features of the apparatus according to the second aspect. It is noticed that the FM stereo receiver has selected mono output of the stereo radio signal or in an alternative embodiment poor radio reception is noticed. In case the FM stereo receiver has selected mono output of the stereo radio signal or in case of poor radio reception, the stereo signal is generated based on a first audio signal and one or more upmix parameters for blind upmix, such as preset upmix parameters.

The remarks to the second aspect of the invention also apply to the sixth aspect of the invention.

Yet another aspect of the invention includes utilizing components of the standard HE-AAC v2 encoder and decoder to efficiently implement an improved FM stereo radio receiver.

Further useful and preferred embodiments are laid down in the dependent claims.

DESCRIPTION OF THE DRAWING

In the following, an exemplary embodiment of the invention will be outlined, focusing on the use of components of the standard HE-ACC v2 encoder and decoder.

FIGURE illustrates an improved FM stereo radio receiver according to the invention.

DETAILED DESCRIPTION

The FIGURE schematically depicts an improved FM stereo radio receiver 100 including a FM stereo radio receiver 10 capable of producing a stereo L/R or Mid-/Side M/S output signal from an FM radio signal received. FM stereo radio receiver 10 can therefore be regarded as a conventional stereo FM radio. The improved stereo radio receiver 100 according to the invention is preferably integrated into a mobile device such as a cell phone, PDA, smart phone, tablet PC, car radio or the like.

Mainly due to unstable FM signal reception conditions typical for mobile devices, conventional FM stereo radio receivers 10 tend to exhibit—at least temporally—bad stereo signal reproduction quality. Therefore, the current invention suggests adding further signal processing components for improved FM reception quality.

A parametric stereo parameter estimation stage 5 is provided for determining one or more parametric stereo parameters 15 and a first audio signal 25—preferably a monodownmix signal generated by a downmix unit 30—based on the left/right L, R or mid/side M, S signal.

A preprocessing unit 50 for further conditioning of the determined parametric stereo parameters 15 can optionally be supplied. Depending on current signal reception properties, such preprocessing unit 50 can either be activated or bypassed.

Furthermore, a quantizer unit 35 is provided, receiving as quantizer unit input values 45 the parametric stereo parameters 15, either as determined or as preprocessed. The quantizer unit 35 generates discrete values from the quantizer unit input values 45 based on quantizer rules such as uniform quantization, non-uniform quantization, fixed point quantization and floating point quantization, wherein the quantizer may further be embodied as a midrise or a midtread quantizer.

The quantized (optionally preprocessed) parametric stereo paramaters 55 can then easily be recovered by an upmix stage 20, using a lookup table 60 for performing de-quantization without the need to apply complex mathematical operations to recover said parameters.

The upmix stage 20 creates the improved L'/R' stereo output signal based on the first audio signal 25 (the mono-downmix signal) and the de-quantized parametric stereo parameters.

The quantizer unit 35 and/or the preprocessing unit 50 are preferably included in the parametric stereo parameter estimation stage 5 respectively standard HE AAC v2 encoder (65) components.

One important aspect of the invention is the idea of using parametric stereo coding and subsequent decoding with the stereo output of a conventional FM radio receiver 10, although there is no typical transmission channel having limited transmission capabilities.

Normally, parametric stereo coding (PS) is applied to stereo signals to be transmitted over a channel having limitations with regard to bitrate, bandwidth or the like. At the receiver side of the channel, the encoded PS-signals are then decoded to recover the stereo signal.

By contrast, the invention suggests to directly combine PS-encoding and decoding of a stereo audio left/right or mid/side signal without an intermediate transmission channel, and preferably integrating the whole signal processing chain in one (mobile) device such as a cell phone, PDA, smart phone, tablet PC, car radio or the like.

This idea is based on knowledge regarding PS-coding to improve reproduction of a stereo signal even if the transmission channel is limited or distorted.

With the present invention, we do not have a (conventional) transmission channel but a potentially limited/distorted audio signal as produced by a (conventional) FM stereo radio receiver. If such audio signal is then further processed using PS-coding and decoding, it will be possible in many situations to improve output signal (L', R') quality compared to the signal output of the (conventional) FM stereo radio receiver, e.g. by selectively generating and applying a stereo upmix matrix by the upmix stage 20 depending on signal properties with regard to the (de-quantized) parametric stereo parameters.

Such stereo upmix matrix's elements may include any values ranging from values corresponding to a good quality stereo output signal to a mere mono signal—and anything inbetween.

As soon as it was perceived that parametric stereo (PS) encoding and subsequent decoding algorithms as implemented in state-of-the-art encoders and decoders will improve reproduced signal quality when used with FM stereo radio receivers, it also became clear that (at least PS-related) components of such a standard codec—like the HE ACC v2—could advantageously be used for executing the invention, normally not requiring redesign or adaptions of such components. Specifically, the quantizer unit's 35 major purpose is to condition the determined parametric stereo parameters such that they may directly be processed by a standard HE ACC v2 decoder, including a simple lookup table for de-quantization. Quantization therefore takes care of providing a data format similar to a standard bitstream format which can directly be processed by a standard HE ACC v2 decoder. In as much that no further coding other than PS-coding is implemented, decoding here merely requires "inverse quantization" using a lookup table.

An improved stereo FM radio receiver 100 according to the invention may be described as a conventional stereo FM radio receiver with subsequent parametric stereo encoding and decoding without an intermediate transmission channel between the PS-encoder and decoder.

From the perspective of a standard HE ACC v2 codec according to the state-of-the art, the invention gives rise to a new and useful use of standard HE AAC v2 decoder 40 components with an FM stereo radio receiver 10, including recovering parametric stereo parameters 15 from quantized parametric stereo parameters 55 fed to the HE AAC v2 decoder 40 using a lookup table 60 for de-quantization, and recovering a stereo signal (L', R') from the recovered parametric stereo parameters and a mono-downmix 25 signal fed to the HE AAC v2 decoder 40.

They invention further gives rise to a new and useful use of standard HE MC v2 encoder 65 components with an FM stereo radio receiver, including determining parametric stereo parameters 15 from a left/right L, R or mid/side M, S audio signal, and creating a mono-downmix signal 25 from the left/right L, R or mid/side M, S audio signal.

In particular, the link between parametric stereo encoder 5/65 and decoder 20/40 can be established very efficiently by using quantized PS data (i.e. parametric stereo parameters) instead of exact values obtained from the parametric stereo parameter estimation stage 5/65.

For an ordinary HE-AAC v2 bitstream, the encoder determines the PS parameters and quantizes them according to a table. After that, the Huffman-coded indices to the table are written to the bitstream. The decoder may then extract the data from the bitstream and perform de-quantization using a look up table.

Without using quantized PS parameters and a lookup table, a lot of transcendental math were needed to reconstruct the decorrelation and/or upmix matrix which has to be applied to the mono downmix signal in the decoder in order to obtain a stereo signal again.

In connection with the present invention, Huffman coding/decoding can be dropped as bitrate efficiency is not an issue when there is no transmission channel with limited capabilities present.

Highlights of the invention can be summed up as follows:

The invention relates to an apparatus for improving a stereo audio signal of an FM stereo radio receiver.

It is suggested to employ components of a standard HE-ACC v2 decoder in such apparatus to efficiently recover the stereo audio signal while also exhibiting good signal quality. To that end, parametric stereo parameters shall be quantized and submitted to such decoder together with a mono-downmix signal. The decoder then can easily recover the parametric stereo parameters, de-quantizing them via simple a lookup table, and finally creating a stereo output signal from the de-quantized parametric stereo parameters and the mono-downmix signal.

The apparatus further includes a parameter estimation stage which may again be embodied on the basis of components of a standard HE-ACC v2 encoder. After estimating the stereo parameters and generating the mono-downmix signal, the encoder will not use further encoding other than the already performed PS-coding.

An apparatus according to the invention therefore advantageously includes decoder and/or encoder components of a standard HE-ACC v2 codec—utilizing its parametric stereo parameter processing capabilities.

Regarding the invention and its various embodiments, reduction of computational complexity is achieved by using the quantized parameters as an index into a table of pre-computed values.

Pre-computing those values in the table involves the calculation of mathematical functions like arccos( ) or arcsin( ) and exp( ) which are computationally expensive.

Using the "de-quantized" value which were—if it is a mere inverse quantization—the value within the table, you do those expensive computations beforehand at compile time and store the pre-computed values in the table instead. This means that you do not need to do those calculations at run-time anymore.

On the other hand, you can only do this when you have a finite number of possible input values to do the calculations on—this being the reason for employing the quantization.

So in addition to "de-quantizing" the PS parameters, the invention implies already performing a significant part of the upmix matrix calculations when using the look-up table.

What is claimed is:

1. An apparatus for improving a left/right or mid/side stereo audio signal of an FM stereo radio receiver, the FM stereo radio receiver configured to receive an FM radio signal comprising a mid signal and side signal, the apparatus comprising:

a parametric stereo parameter estimation stage, the parameter estimation stage configured to determine one or more parametric stereo parameters based on the left/right or mid/side audio signal in a frequency-variant or frequency-invariant manner;

an upmix stage, the upmix stage configured to generate a stereo signal based on a first audio signal and the one or more parametric stereo parameters, the first audio signal obtained from the left/right or mid/side audio signal; and a quantizer unit operatively connecting the parametric stereo parameter estimation stage to the upmix stage, wherein the upmix stage includes a standard HE AAC v2 decoder.

2. The apparatus according to claim 1, wherein the quantizer unit receives as quantizer unit input parameters the parametric stereo parameters as determined by the parametric stereo parameter estimation stage or as preprocessed parametric stereo parameters.

3. The apparatus according to claim 2, wherein the quantizer unit is configured to quantize the quantizer input parameters using any of uniform quantization, non-uniform quantization, fixed point quantization and floating point quantization.

4. The apparatus according to claim 1, wherein the quantizer unit is embodied as a midrise or a midtread quantizer.

5. The apparatus according to claim 2, wherein the upmix stage is configured to de-quantize the quantized parametric stereo parameters respectively preprocessed parametric stereo parameters using a lookup table.

6. The apparatus according to claim 2, wherein the quantized parametric stereo parameters respectively preprocessed parametric stereo parameters are not coded and/or compressed other than being quantized and representing parametric stereo parameters.

7. The apparatus according to claim 1, wherein the parametric stereo parameter estimation stage includes a standard HE AAC v2 encoder.

8. The apparatus according to claim 2, wherein the first audio signal is a mono-downmix signal generated from the left/right or mid/side audio signal, wherein the parametric stereo parameter estimation stage does not apply a coding and/or compression scheme to the determined parametric stereo parameters respectively preprocessed parametric stereo parameters and the mono-downmix-signal.

* * * * *